(12) United States Patent
Tang et al.

(10) Patent No.: US 11,229,019 B2
(45) Date of Patent: Jan. 18, 2022

(54) WIRELESS COMMUNICATION METHOD, NETWORK DEVICE AND TERMINAL DEVICE

(71) Applicant: Guangdong OPPO Mobile Telecommunications Corp., Ltd., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/444,434

(22) Filed: Jun. 18, 2019

(65) Prior Publication Data

US 2019/0306845 A1 Oct. 3, 2019

Related U.S. Application Data

(63) Continuation of application No. PCT/CN2016/112216, filed on Dec. 26, 2016.

(51) Int. Cl.
*H04W 72/04* (2009.01)
*H04J 1/06* (2006.01)
*H04J 1/14* (2006.01)

(52) U.S. Cl.
CPC ........... *H04W 72/042* (2013.01); *H04J 1/065* (2013.01); *H04J 1/14* (2013.01); *H04W 72/04* (2013.01);
(Continued)

(58) Field of Classification Search
None
See application file for complete search history.

(56) References Cited

U.S. PATENT DOCUMENTS

2013/0163543 A1  6/2013  Freda et al.
2014/0086201 A1  3/2014  Nagata et al.
(Continued)

FOREIGN PATENT DOCUMENTS

CN   102932299 A   2/2013
CN   103312649 A   9/2013
(Continued)

OTHER PUBLICATIONS

Extended European Search Report for 169259884 dated Oct. 31, 2019.
(Continued)

*Primary Examiner* — Rebecca E Song
(74) *Attorney, Agent, or Firm* — Young Basile Hanlon & MacFarlane, P.C.

(57) ABSTRACT

A wireless communication method, a network device and a terminal device are provided. The method comprises: transmitting a first control channel in a first period of time, wherein the first control channel carries scheduling information of a first data channel; receiving or transmitting the first data channel in a second period of time according to the scheduling information of the first data channel; transmitting a second control channel in a frequency division multiplexing manner with the first data channel at part time of the second period of time, wherein a data channel scheduled by the second control channel does not include the first data channel, and a starting position of the part time is not earlier than an ending position of the first period of time.

22 Claims, 12 Drawing Sheets

(52) U.S. Cl.
CPC ......... *H04W 72/0453* (2013.01); *Y02D 30/70* (2020.08)

(56) References Cited

U.S. PATENT DOCUMENTS

| | | | |
|---|---|---|---|
| 2014/0119253 | A1 | 5/2014 | Weng et al. |
| 2015/0163771 | A1 | 6/2015 | Kim et al. |
| 2015/0256403 | A1* | 9/2015 | Li ................ H04L 27/2602 370/235 |
| 2015/0304995 | A1 | 10/2015 | Yi et al. |
| 2017/0195946 | A1 | 7/2017 | Jung et al. |
| 2017/0318564 | A1* | 11/2017 | Lee ................ H04L 5/0092 |
| 2017/0367046 | A1* | 12/2017 | Papasakellariou ........... H04W 72/0453 |
| 2018/0213530 | A1* | 7/2018 | Mochizuki .......... H04L 5/0044 |
| 2019/0116592 | A1* | 4/2019 | Moon .................. H04L 5/00 |
| 2019/0229878 | A1* | 7/2019 | Takeda ............. H04L 5/0053 |
| 2019/0230695 | A1* | 7/2019 | Takeda ............. H04W 72/12 |

FOREIGN PATENT DOCUMENTS

| | | |
|---|---|---|
| CN | 103312650 A | 9/2013 |
| CN | 103503546 A | 1/2014 |
| CN | 104012159 A | 8/2014 |
| CN | 104335651 A | 2/2015 |
| CN | 104782067 A | 7/2015 |
| EP | 2765724 A2 | 8/2014 |
| EP | 2827663 A1 | 1/2015 |
| JP | 2015505436 A | 2/2015 |
| RU | 2599729 C1 | 10/2016 |

OTHER PUBLICATIONS

TW OA with English Translation for TW Application 10920024470 dated Jan. 10, 2020.
Invitation to Respond to Written Opinion for Singapore Application 11201905616W dated Jun. 11, 2020.
3GPP TS 36.211 V14.0.0 (Sep. 2016); 650 Route des Lucioles—Sophia Antipolis; Valbonne—France.
English translation of Russian OA for RU application 2019122474/07 dated Apr. 17, 2020.
English translation of CL OA for CL application 201901681 dated Mar. 18, 2020.
EP Examination for EP application No. 17930507.3 dated Mar. 17, 2020.
Brazil Office Action with English Translation for BR Application BR112019012462-4 dated Sep. 11, 2020.
China Office Action with English Translation for CN Application 201911329423.7 dated Nov. 2, 2020.
Chile Office Action with English Translation for CL Application 2019-001681 dated Sep. 9, 2020.
Communication pursuant to Article 94(3) EPC Examination for EP Application 16925988.4 dated Oct. 1, 2020.
Canada Office Action for CA Application 3,047,484 dated Sep. 28, 2020.
Canadian Examination Report for CA Application 3072523 dated Apr. 1, 2021. (3 pages).
Communication pursuant to Article 94(3) EPC for EP Application 17921945.6 dated Apr. 9, 2021. (7 pages).
First Japanese Office Action with English Translation for Application No. 2019-533205 dated Jan. 5, 2021.
First Indian Examination Report for Application No. 201917023957 dated Feb. 12, 2021.
3GPP TSG RAN WG1 Meeting #84bis; R1-163101; Busan, Korea, Apr. 11-15, 2016 pp. 1-5.
Japan Decision of Rejection with English Translation for JP Application 2019533205 dated May 14, 2021.
Communication pursuant to Article 94(3) EPC Examination for EP Application 16925988.4 dated Apr. 1, 2021.
Canadian Examination Report for CA Application 3047484 dated Aug. 10, 2021. (4 pages).
Communication pursuant to Article 94(3) EPC for EP Application 16925988.4 dated Jul. 16, 2021. (6 pages).
Israel Office Action with English Translation for IL Application 267498 dated Aug. 1, 2021. (8 pages).
Taiwan Office Action with English Translation for TW Application 106141460 dated Jun. 2, 2021. (5 pages).
Indonesia Office Action with English Translation for ID Application P00201906221 dated Aug. 31, 2021. (6 pages).
Australian Examination Report for AU Application 2016434311 dated Sep. 28, 2021. (3 pages).
Japanese Reconsideration Report by Examiner before Appeal with English Translation for JP Application 2019533205 dated Oct. 26, 2021. (7 pages).

\* cited by examiner

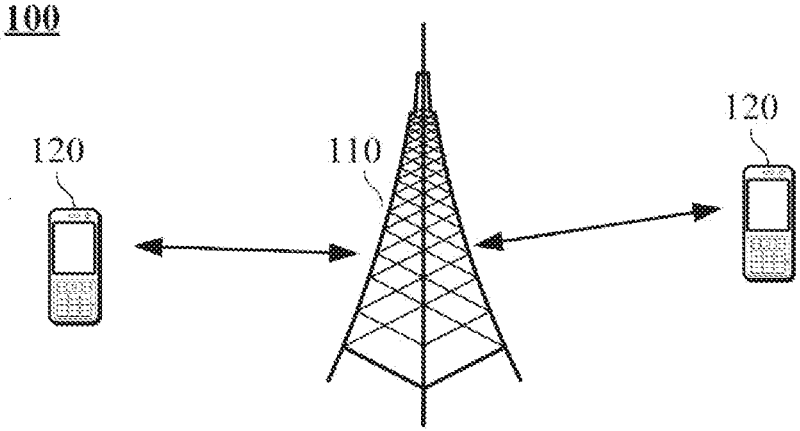

FIG. 1

Transmit a first control channel in a first period of time, the first control channel carrying scheduling information of a first data channel — 210

Receive or transmit the first data channel in a second period of time according to the scheduling information of the first data channel — 220

Transmit a second control channel in a frequency division multiplexing manner with the first data channel in part time of the second period of time, wherein a data channel scheduled by the second control channel does not include the first data channel, and a starting position of the part time is not earlier than an ending position of the first period of time — 230

FIG. 2

WIRELESS COMMUNICATION METHOD, NETWORK DEVICE AND TERMINAL DEVICE

CROSS-REFERENCE TO RELATED APPLICATION(S)

This application is a continuation application of International Application No. PCT/CN2016/112216, filed on Dec. 26, 2016, the entire disclosure of which is hereby incorporated by reference.

TECHNICAL FIELD

The present disclosure relates to the field of communication, and more particularly to a wireless communication method, a network device and a terminal device.

BACKGROUND

In a current Long Term Evolution (LTE) system, a Physical Downlink Control Channel (PDCCH) occupies first few symbols of each subframe. During transmission of full frequency band of a carrier, a Physical Downlink Shared Channel (PDSCH) cannot be transmitted in symbols where the PDCCH is located, and the PDSCH starts to be transmitted only after the PDCCH is finished.

In a 5G (also known as New Radio (NR)) system, it is supported that a PDCCH and a PDSCH occupy different frequency domain resources in first few symbols of a time slot. However, the PDSCH of the first few symbols cannot start to be demodulated until decoding for the PDCCH is completed, which results in that a terminal needs to pre-cache signals of few symbols. In addition, 5G bandwidth is very large, which brings great challenges to the buffering capability, processing burden, and battery power consumption of the terminal.

SUMMARY

Implementations of the present disclosure provide a wireless communication method, a network device, and a terminal device.

In a first aspect, there is provided a wireless communication method including: transmitting a first control channel in a first period of time, wherein the first control channel carries scheduling information of a first data channel; receiving or transmitting the first data channel in a second period of time according to the scheduling information of the first data channel; and transmitting a second control channel in a frequency division multiplexing manner with the first data channel in part time of the second period of time, wherein a data channel scheduled by the second control channel does not include the first data channel, and a starting position of the part time is not earlier than an ending position of the first period of time.

Optionally, a starting position of the first period of time is earlier than a starting position of the second period of time, the first control channel between the starting position of the first period of time and the starting position of the second period of time, and a second data channel are frequency division multiplexed, and the second data channel is scheduled by a control channel before the first control channel.

Optionally, an ending position of the first period of time is earlier than or equal to a starting position of the second period of time.

Optionally, a starting position of the second control channel in the second period of time is later than the starting position of the second period of time, and/or, an ending position of the second control channel in the second period of time is earlier than an ending position of the second period of time.

Optionally, the second control channel is only transmitted in part time of the second period of time.

Optionally, a time difference between a starting position of the first period of time and a starting position of the second period of time is greater than or equal to the maximum value of multiple time differences, which may exist in a wireless communication process, between multiple control channels and their scheduled data channels.

Optionally, the method further includes: transmitting indication information including information of a position of the second period of time relative to the first period of time and/or information of a length of the second period of time.

Optionally, the indication information is used for indicating a relative position of a starting position of the second period of time relative to a starting position of the first period of time, or for indicating a relative position of the starting position of the second period of time relative to the ending position of the first period of time.

Optionally, transmitting the indication information includes: transmitting the indication information, wherein the indication information includes information of positions and/or lengths of transmission time corresponding to multiple data channels scheduled by multiple control channels, and the multiple control channels include the first control channel.

Optionally, transmitting the indication information includes: transmitting the indication information through a high-layer signaling or physical-layer control signaling.

In a second aspect, there is provided a wireless communication method including: transmitting indication information including information of a position and/or a length of a transmission time period of a data channel scheduled by a control channel; transmitting the control channel; and receiving or transmitting the data channel during the transmission time period of the data channel.

Optionally, the indication information is used for indicating a relative position of a starting position of the transmission time period of the data channel relative to a starting position of a transmission time period of the control channel; or, a relative position of a starting position of the transmission time period of the data channel relative to an ending position of a transmission time period of the control channel.

Optionally, transmitting the indication information includes: transmitting the indication information, wherein the indication information includes information of positions and/or lengths of transmission time corresponding to multiple data channels scheduled by multiple control channels, and the multiple control channels include the control channel.

Optionally, transmitting the indication information includes: transmitting the indication information through a high-layer signaling or physical-layer signaling.

In a third aspect, there is provided a wireless communication method including: on a first control channel transmitted in a first period of time, receiving, by a terminal device, scheduling information corresponding to the terminal device in scheduling information of a first data channel, wherein the first control channel is used for scheduling the first data channel, and the first data channel is transmitted in a second period of time; receiving or transmitting data corresponding to the terminal device in the first data channel according to the scheduling information for the terminal device; wherein the first data channel and the second control channel are frequency division multiplexed in part time of the second period of time, and the data channel scheduled by the second control channel does not include the first data channel, wherein a starting position of the part time is not earlier than an ending position of the first period of time.

Optionally, a starting position of the first period of time is earlier than a starting position of the second period of time, the first control channel between the starting position of the first period of time and the starting position of the second period of time, and a second data channel are frequency division multiplexed, and the second data channel is scheduled by a control channel before the first control channel.

Optionally, an ending position of the first period of time is earlier than or equal to a starting position of the second period of time.

Optionally, a starting position of the second control channel in the second period of time is later than the starting position of the second period of time, and/or, an ending position of the second control channel in the second period of time is earlier than an ending position of the second period of time.

Optionally, the second control channel is only transmitted in part time of the second period of time.

Optionally, a time difference between a starting position of the first period of time and a starting position of the second period of time is greater than or equal to the maximum value of multiple time differences, which may exist in a wireless communication process, between multiple control channels and their scheduled data channels.

Optionally, the method further includes: receiving indication information including information of a position of the second period of time relative to the first period of time and/or information of a length of the second period of time; wherein receiving or transmitting the data corresponding to the terminal device in the first data channel according to the scheduling information for the terminal device includes: receiving or transmitting the data corresponding to the terminal device in the first data channel according to the indication information and the scheduling information.

Optionally, the indication information is used for indicating a relative position of a starting position of the second period of time relative to a starting position of the first period of time, or for indicating a relative position of the starting position of the second period of time relative to the ending position of the first period of time.

Optionally, receiving the indication information includes receiving the indication information, wherein the indication information includes information of positions and/or lengths of transmission time corresponding to multiple data channels scheduled by multiple control channels, and the multiple control channels include the first control channel.

Optionally, receiving the indication information includes: receiving the indication information transmitted through a high-layer signaling or physical-layer control signaling.

In a fourth aspect, there is provided a wireless communication method including: receiving indication information including information of a position and/or a length of a data channel scheduled by a control channel; receiving or transmitting data corresponding to the terminal device in the data channel in a transmission time period of the data channel according to the indication information and the scheduling information for the terminal device in the control channel.

Optionally, the indication information is used for indicating a relative position of a starting position of the transmission time period of the data channel relative to a starting position of a transmission time period of the control channel; or, a relative position of a starting position of the transmission time period of the data channel relative to an ending position of a transmission time period of the control channel.

Optionally, receiving the indication information includes receiving the indication information, wherein the indication information includes information of positions and/or lengths of transmission time corresponding to multiple data channels scheduled by multiple control channels, and the multiple control channels include the control channel.

Optionally, receiving the indication information includes: receiving the indication information transmitted through a high-layer signaling or physical-layer signaling.

In a fifth aspect, there is provided a network device, and the network device may include units that perform the method of the first aspect or the method in any one of optional implementations of the first aspect.

In a sixth aspect, there is provided a network device, and the network device may include units that perform the method of the second aspect or the method in any one of optional implementations of the second aspect.

In a seventh aspect, there is provided a terminal device, and the terminal device may include units that perform the method of the third aspect or the method in any one of optional implementations of the third aspect.

In an eighth aspect, there is provided a terminal device, and the terminal device may include units that perform the method of the fourth aspect or the method in any one of optional implementations of the fourth aspect.

In a ninth aspect, there is provided a network device, and the network device may include a memory and a processor, the memory stores instructions, and the processor is used for calling the instructions stored in the memory to perform the method in the first aspect or any optional implementation thereof.

In a tenth aspect, there is provided a network device, and the network device may include a memory and a processor, the memory stores instructions, and the processor is used for calling the instructions stored in the memory to perform the method in the second aspect or any optional implementation thereof.

In an eleventh aspect, there is provided a terminal device, which may include a memory and a processor, the memory stores instructions, and the processor is used for calling the instructions stored in the memory to perform the method in the third aspect or any optional implementation thereof.

In a twelfth aspect, there is provided a terminal device, which may include a memory and a processor, the memory stores instructions, and the processor is used for calling the instructions stored in the memory to perform the method in the fourth aspect or any optional implementation thereof.

In a thirteenth aspect, a computer readable medium is provided. The computer readable medium stores program codes executable by a network device, and the program codes include instructions for executing the method of the first aspect or the method in any one of the implementations of the first aspect.

In a fourteenth aspect, a computer readable medium is provided. The computer readable medium stores program codes executable by a network device, and the program codes include instructions for executing the method of the second aspect or the method in any one of the implementations of the second aspect.

In a fifteenth aspect, a computer readable medium is provided. The computer readable medium stores program codes executable by a terminal device, and the program codes include instructions for executing the method of the third aspect or the method in any one of the implementations of the third aspect.

In a sixteenth aspect, a computer readable medium is provided. The computer readable medium stores program codes executable by a terminal device, and the program codes include instructions for executing the method of the fourth aspect or the method in any one of the implementations of the fourth aspect.

In a seventeenth aspect, there is provided a system chip including an input interface, an output interface, a processor and a memory, and the processor is used for executing codes in the memory, and when the codes are executed, the processor may implement the methods in the first aspect and any one of implementations.

In an eighteenth aspect, there is provided a system chip including an input interface, an output interface, a processor and a memory, and the processor is used for executing codes in the memory, and when the codes are executed, the processor may implement the methods in the second aspect and any one of implementations.

In a nineteenth aspect, there is provided a system chip including an input interface, an output interface, a processor and a memory, and the processor is used for executing codes in the memory, and when the codes are executed, the processor may implement the methods in the third aspect and any one of implementations.

In a twentieth aspect, there is provided a system chip including an input interface, an output interface, a processor and a memory, and the processor is used for executing codes in the memory, and when the codes are executed, the processor may implement the methods in the fourth aspect and any one of implementations.

BRIEF DESCRIPTION OF DRAWINGS

To describe technical schemes of implementations of the present disclosure more clearly, drawings that need to be used in the description of the implementations or the related art will be briefly introduced below. It is apparent that the drawings described below are only some implementations of the present disclosure; and for those of ordinary skill in the art, other drawings may be obtained according to these drawings without paying an inventive effort.

FIG. 1 is a diagram of an application scenario according to an implementation of the present disclosure.

FIG. 2 is a schematic flowchart of a wireless communication method according to an implementation of the present disclosure.

DETAILED DESCRIPTION

Figure 3:
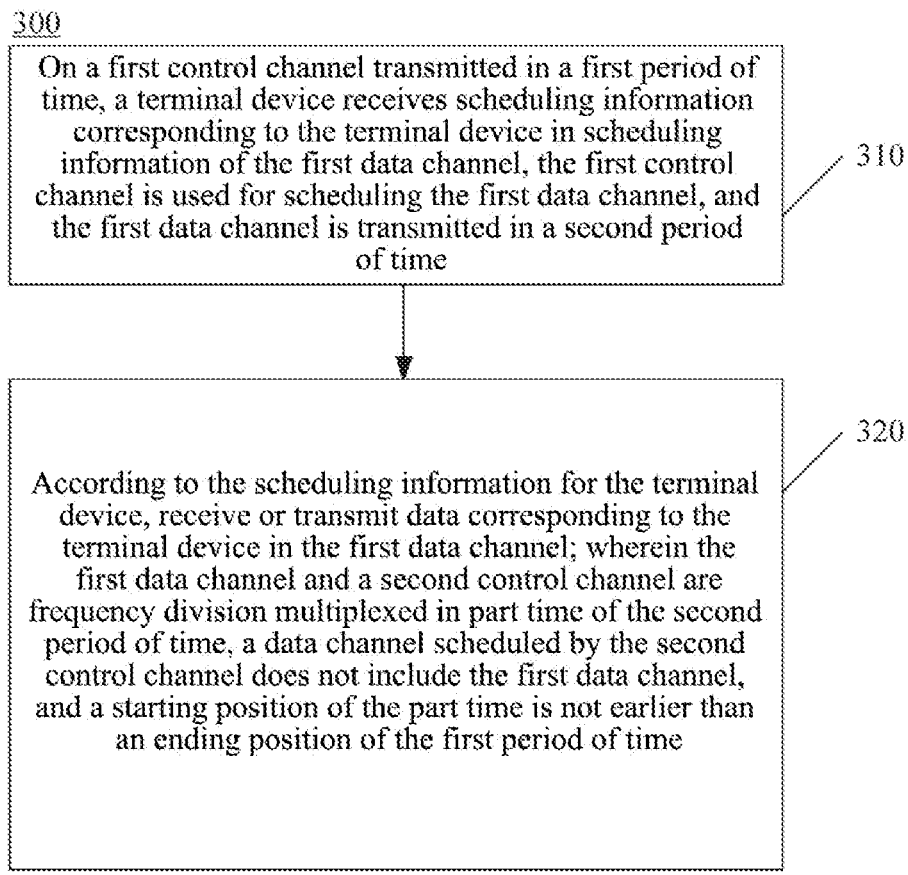
FIG. 3 is a schematic flowchart of a wireless communication method according to an implementation of the present disclosure.

The technical solutions in the implementations of the present disclosure are described in the following with reference to the drawings in the implementations of the present disclosure. It is apparent that the implementations described below are only part, but not all, of the implementations of the present disclosure. All other implementations obtained by those skilled in the art based on the implementations of the present disclosure without paying an inventive effort are within the protection scope of the present disclosure.

The technical solutions of the implementations of the present disclosure may be applied to various communication systems, such as a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a future 5G system.

FIG. 1 shows a wireless communication system 100 to which an implementation of the present disclosure is applied. The wireless communication system 100 may include a network device 110. The network device 100 may be a device that communicates with a terminal device. The network device 100 may provide communication coverage for a specific geographical area and may communicate with terminal devices (e.g., UEs) located within the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or, the network device may be a relay station, an access point, an on-board device, or a wearable device, a network side device in a future 5G network, or a network device in a future evolved Public Land Mobile Network (PLMN), etc.

The wireless communication system 100 further includes at least one terminal device 120 located within the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, an on-board device, a wearable device, a terminal device in a future 5G network, or a terminal device in a future evolved PLMN, or the like.

Optionally, the 5G system or network may also be referred to as a New Radio (NR) system or network.

FIG. 1 exemplifies one network device and two terminal devices. Optionally, the wireless communication system 100 may include multiple network devices and other quantities of terminal devices may be included within a coverage area of each network device. The implementations of the present disclosure are not limited thereto.

Optionally, the wireless communication system 100 may include other network entities such as a network controller, and a mobility management entity. The implementations of the present disclosure are not limited thereto.

It should be understood that the terms "system" and "network" are often used interchangeably herein. The term "and/or" in this document is merely an association relationship describing associated objects, indicating that there may be three relationships, for example, A and/or B, which may indicate three situations: A alone, A and B, and B alone. In addition, the symbol "/" in this document generally indicates that objects of the former and the latter connected by "/" has an "or" relationship.

FIG. 2 is a schematic flowchart of a wireless communication method 200 according to an implementation of the present disclosure. The method may optionally be performed by a network device.

As shown in FIG. 2, the method 200 includes acts 210-230.

In 210, a first control channel is transmitted in a first period of time, wherein the first control channel carries scheduling information of a first data channel.

In 220, the first data channel is received or transmitted in a second period of time according to the scheduling information of the first data channel.

In 230, a second control channel is transmitted in a frequency division multiplexing manner with the first data channel in part time of the second period of time, and a data channel scheduled by the second control channel does not include the first data channel, wherein a starting position of the part time is not earlier than an ending position of the first period of time.

FIG. 3 is a schematic flowchart of a communication method 300 according to an implementation of the present disclosure. The method may optionally be performed by a terminal device. As shown in FIG. 3, the method includes the following acts 310 and 320.

In 310, on a first control channel transmitted in a first period of time, a terminal device receives scheduling information corresponding to the terminal device in scheduling information of the first data channel, and the first control channel is used for scheduling the first data channel, and the first data channel is transmitted in a second period of time.

In 320, according to the scheduling information for the terminal device, data corresponding to the terminal device in the first data channel is received or transmitted; wherein the first data channel and a second control channel are frequency division multiplexed in part time of the second period of time, and a data channel scheduled by the second control channel does not include the first data channel, wherein a starting position of the part time is not earlier than an ending position of the first period of time.

Therefore, in an implementation of the present disclosure, a network device transmits a first control channel during a first period of time, and may schedule a first data channel transmitted during a second period of time, wherein a second control channel is transmitted in a frequency division multiplexing manner with the first data channel in part time of the second period of time, and a data channel scheduled by the second control channel does not include the first data channel, wherein a starting position of the part time is not earlier than an ending position of the first period of time. That is to say, the data channel that is frequency division multiplexed with the second control channel may be completely or partially scheduled by a control channel before the second control channel, thereby preventing a terminal device from caching too many data symbols, thereby reducing the requirement on the capability of the terminal device for receiving signals, reducing the processing burden of the terminal device, and reducing the battery consumption of the terminal device.

Optionally, the first control channel may be a Physical Downlink Control Channel (PDCCH).

Optionally, the first data channel may be a Physical Uplink Shared Channel (PUSCH) or a Physical Downlink Shared Channel (PDSCH).

Optionally, the first control channel may occupy at least one symbol of at least one time domain unit. For example, first few symbols of a subframe or slot may be occupied.

Optionally, the first control channel may occupy at least one symbol of at least one time domain unit. For example, multiple symbols of two adjacent time domain units may be occupied, for example, symbols that are later in time of a former time domain unit are occupied and symbols that are earlier in time of a latter time domain unit are occupied.

Optionally, time domain units occupied by the first control channel may be completely different from time domain units occupied by the first data channel.

Optionally, in the implementation of the present disclosure, time occupied by a data channel scheduled once through a control channel may be referred to as a time domain unit corresponding to the data channel; or, an interval between two data channels scheduled twice through control channels is referred to as a time domain unit corresponding to the data channel.

Optionally, time occupied by a control channel may be referred to as a time domain unit corresponding to the control channel; or, an interval between two control channels is referred to as a time domain unit corresponding to the control channel.

Optionally, a duration jointly occupied by a control channel and a data channel scheduled by the control channel may be referred to as a time domain unit; or, a time domain unit is divided by a fixed duration within which a control channel or part of a data channel scheduled by the control channel may be transmitted.

It should be understood that a time domain unit may be called differently for different situations, for example, a time domain unit corresponding to a data channel is called a time domain scheduling unit. Of course, a duration jointly occupied by a control channel and a data channel scheduled by the control channel may be called a time domain scheduling unit. It is not specifically limited in the implementations of the present disclosure.

Optionally, the time domain unit mentioned in the implementations of the present disclosure may be a subframe or a time slot, but is not limited thereto.

Optionally, a starting position of the first period of time is earlier than a starting position of the second period of time, the first control channel between the starting position of the first period of time and the starting position of the second period of time, and the second data channel are frequency division multiplexed, and the second data channel is scheduled by a control channel before the first control channel.

That is, a data channel which is frequency division multiplexed with a first control channel may also be scheduled by a control channel before the first control channel.

Optionally, an ending position of the first period of time is earlier than or equal to a starting position of the second period of time.

When the ending position of the first period of time is earlier than the starting position of the second period of time, a time interval between the ending position and the starting position may be determined according to specific circumstances.

For example, in one implementation, the time interval between the ending position and the starting position may be greater than or equal to demodulation time of a first control channel, that is, a first data channel is transmitted after demodulation of the control channel is completed.

For example, in another implementation, an interval between starting time of a first control channel and starting time of a first data channel is greater than or equal to the maximum transmission duration of all possible control channels. If a transmission duration of the first control channel is not the maximum transmission duration, an ending position of the first control channel has a certain time interval with an ending position of the first data channel.

Optionally, a starting position of the second control channel in the second period of time is later than the starting position of the second period of time, and/or, an ending position of the second control channel in the second period of time is earlier than an ending position of the second period of time.

Optionally, the second control channel is only transmitted in part time of the second period of time.

Optionally, a time difference between a starting position of the first period of time and a starting position of the second period of time is greater than or equal to the maximum value of multiple time differences, which may exist in a wireless communication process, between multiple control channels and their scheduled data channels.

Optionally, in the implementation of the present disclosure, a network device may transmit indication information to a terminal device, and the indication information includes information of a position of the second period of time relative to the first period of time and/or information of a length of the second period of time.

In one implementation, the indication information is transmitted, and the indication information includes information of positions and/or lengths of transmission time corresponding to multiple data channels scheduled by multiple control channels, and the multiple control channels include the first control channel.

In another implementation, the indication information is transmitted, and the indication information only includes information of a position and/or a length of the transmission time corresponding to the first data channel.

Optionally, the indication information is used for indicating a relative position of a starting position of the second period of time relative to a starting position of the first period of time, or for indicating a relative position of the starting position of the second period of time relative to an ending position of the first period of time.

Of course, the indication information may include information such as an ending position of the second period of time, and will not be repeated here.

Optionally, the indication information is transmitted through a high-layer signaling or physical-layer control signaling.

Optionally, in the implementation of the present disclosure, a network device may transmit indication information in a dynamic or semi-static manner, wherein the dynamic manner is that the indication information each time only carries information of a position and/or a length of transmission time of a data channel corresponding to one control channel; and the semi-static manner is that the indication information each time may carry information of positions and/or lengths of data channels respectively corresponding to multiple control channels.

The indication information may be transmitted semi-statically through a high-layer signaling, or the indication information may be transmitted dynamically through a physical-layer control signaling.

Optionally, the high-layer signaling may be a Radio Resource Control (RRC) message, or System Information (SI).

Optionally, the physical-layer control signaling may be Downlink control information (DCI).

In order to facilitate a clearer understanding of the present disclosure, a scheduling method according to an implementation of the present disclosure will be described below with reference to FIGS. 4 and 5A-5D.

Figure 4:
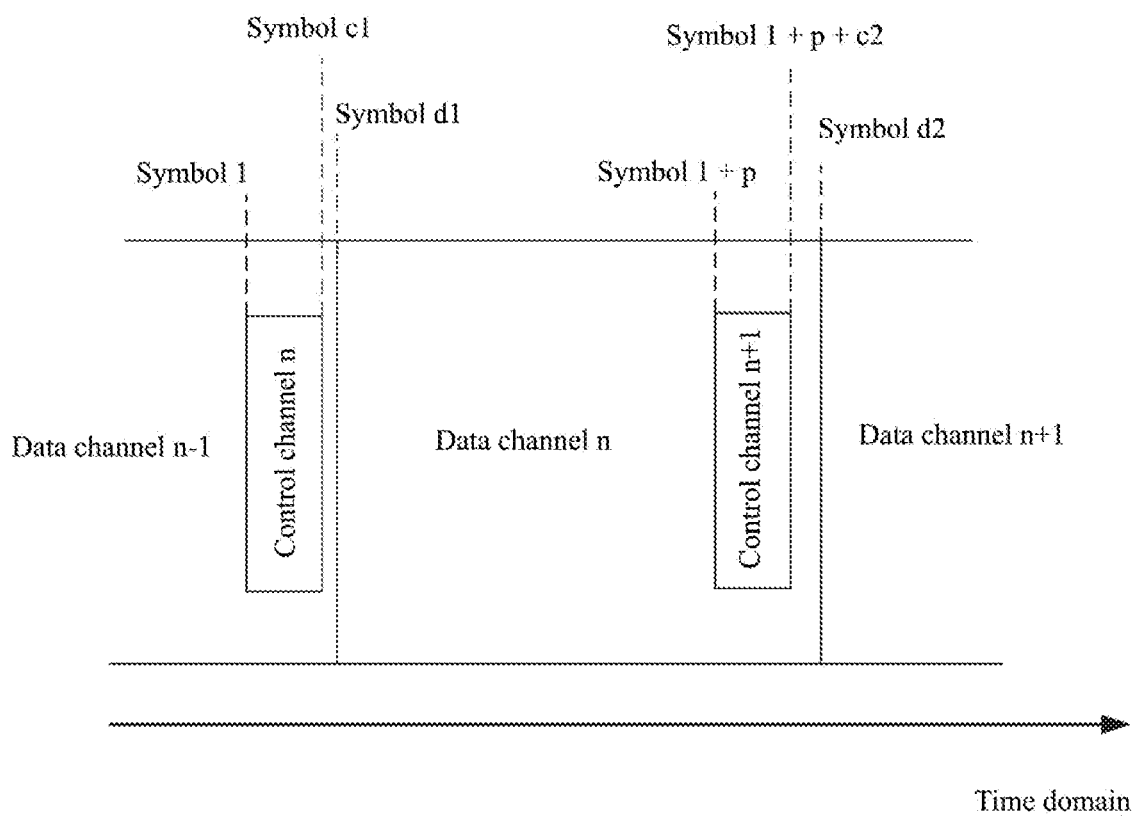
FIG. 4 is a diagram of relationship of a control channel and a data channel in a time domain according to an implementation of the present disclosure.

As shown in FIG. 4, assuming that a transmission cycle of a control channel is P symbols (i.e., an interval of symbols between two control channels), the nth control channel is located from symbol 1 to symbol c1, and the n+1th control channel is distributed from symbol P+1 to symbol 1+P+c2, then the nth data channel is distributed from symbol d1 to symbol d2, and d1>c1, d2>1+P+c2, and the nth data channel is scheduled by the nth control channel. Similarly, a scheduling manner of the n+1th data channel and that of the n−1th data channel are similar.

Figure 5A:
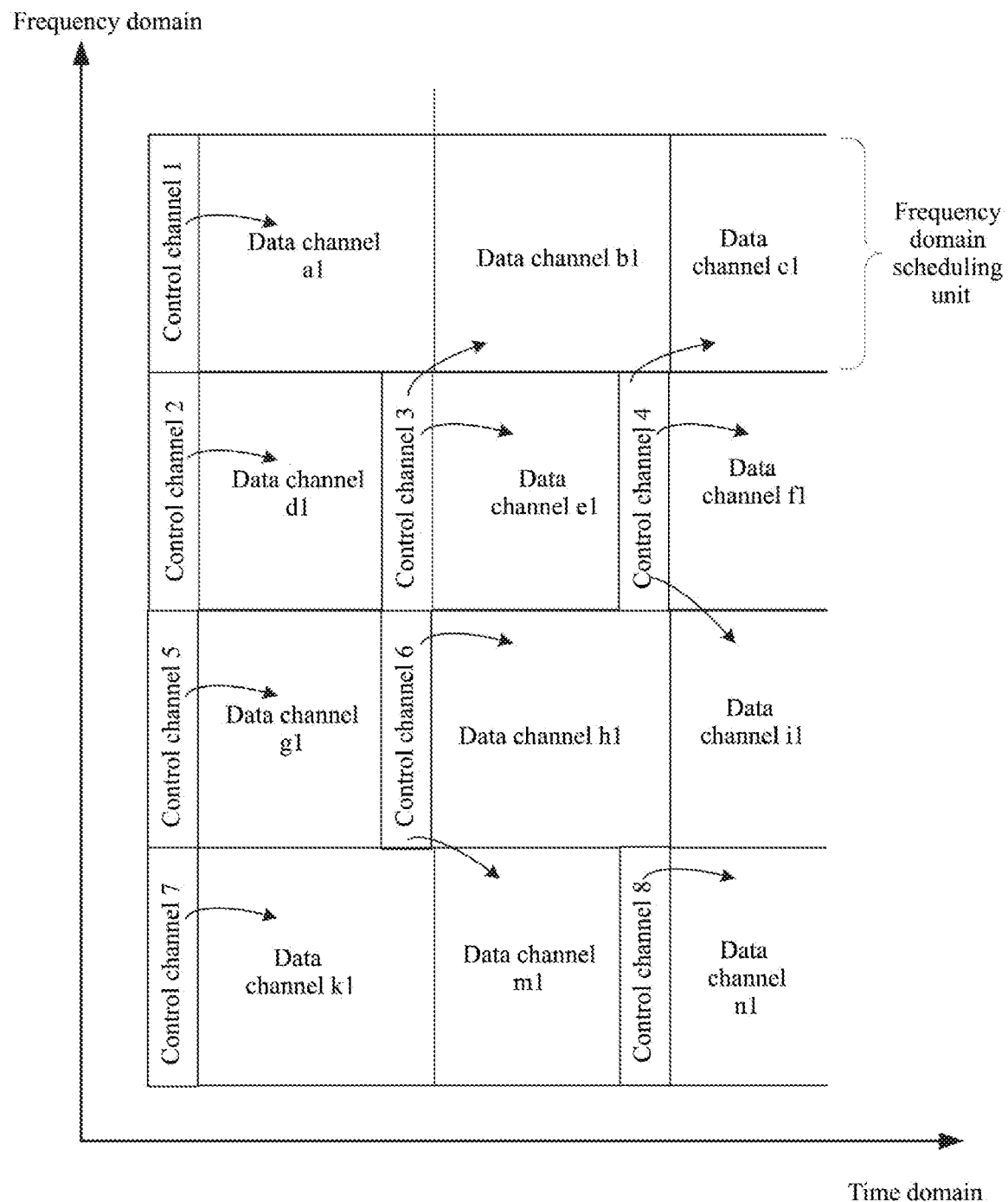
FIG. 5A is a schematic diagram of a scheduling manner of a control channel to a data channel according to an implementation of the present disclosure.

As shown in FIG. 5A, control channel 1 may schedule data channel a1, control channel 2 may schedule data channel d1, control channel 3 may schedule data channel b1 and data channel e1, control channel 4 may schedule data channel c1, data channel f, and data channel i1, control channel 5 may schedule data channel g1, control channel 6 may schedule data channel h1 and data channel m1, control channel 7 may schedule data channel k1, and control channel 8 may schedule data channel n1.

Figure 5B:
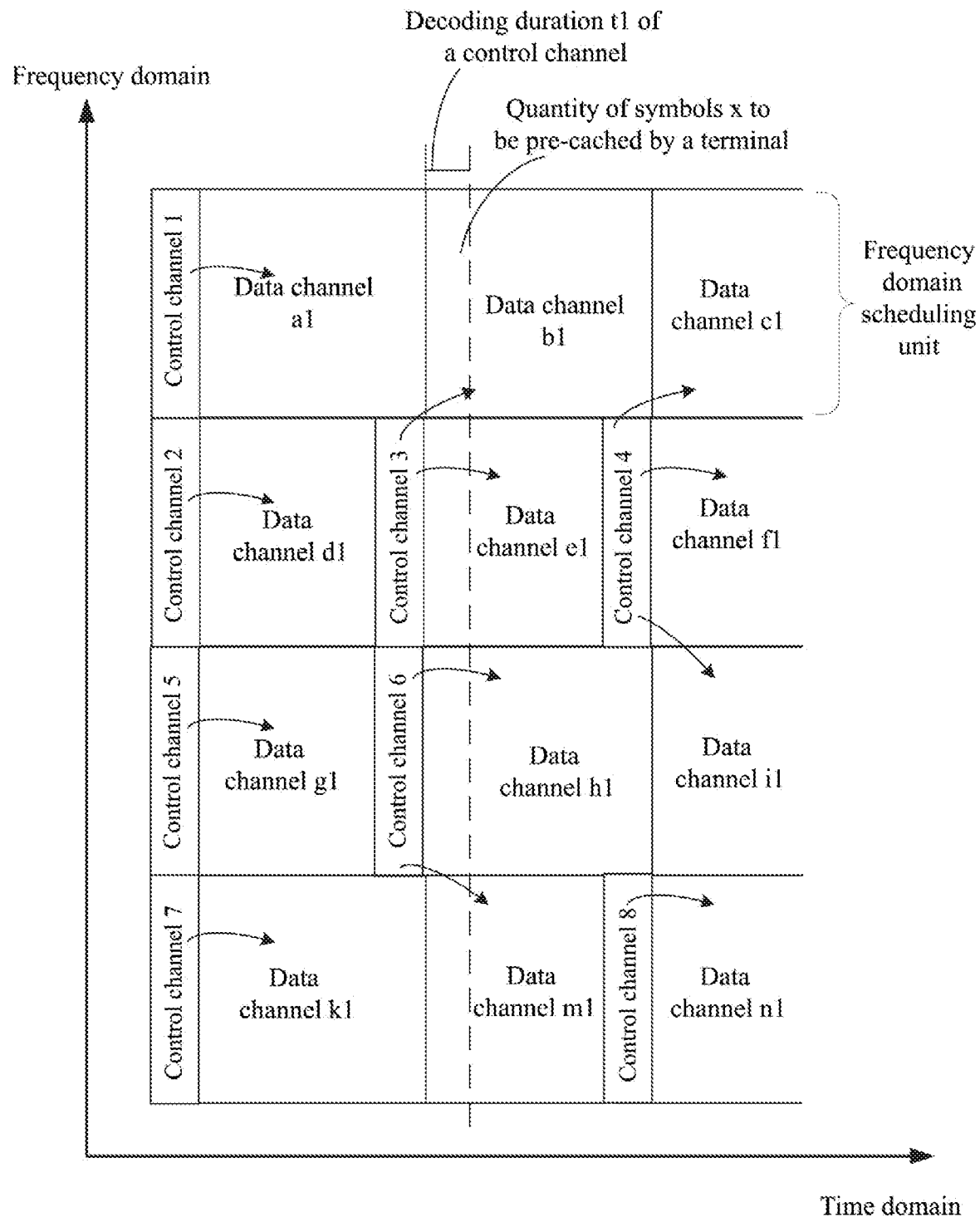
FIG. 5B is a schematic diagram of symbols required to be pre-stored by a terminal device using the scheduling manner shown in FIG. 5A.

FIG. 5B shows, using the scheduling method shown in FIG. 5A, the quantity of symbols that a terminal needs to pre-cache when the terminal device decodes the control channels 3 and 6. As shown in FIG. 5B, a duration required for caching a data channel is a decoding duration t1 of a control channel, and the quantity of symbols to be pre-cached by the terminal is x.

Figure 5C:
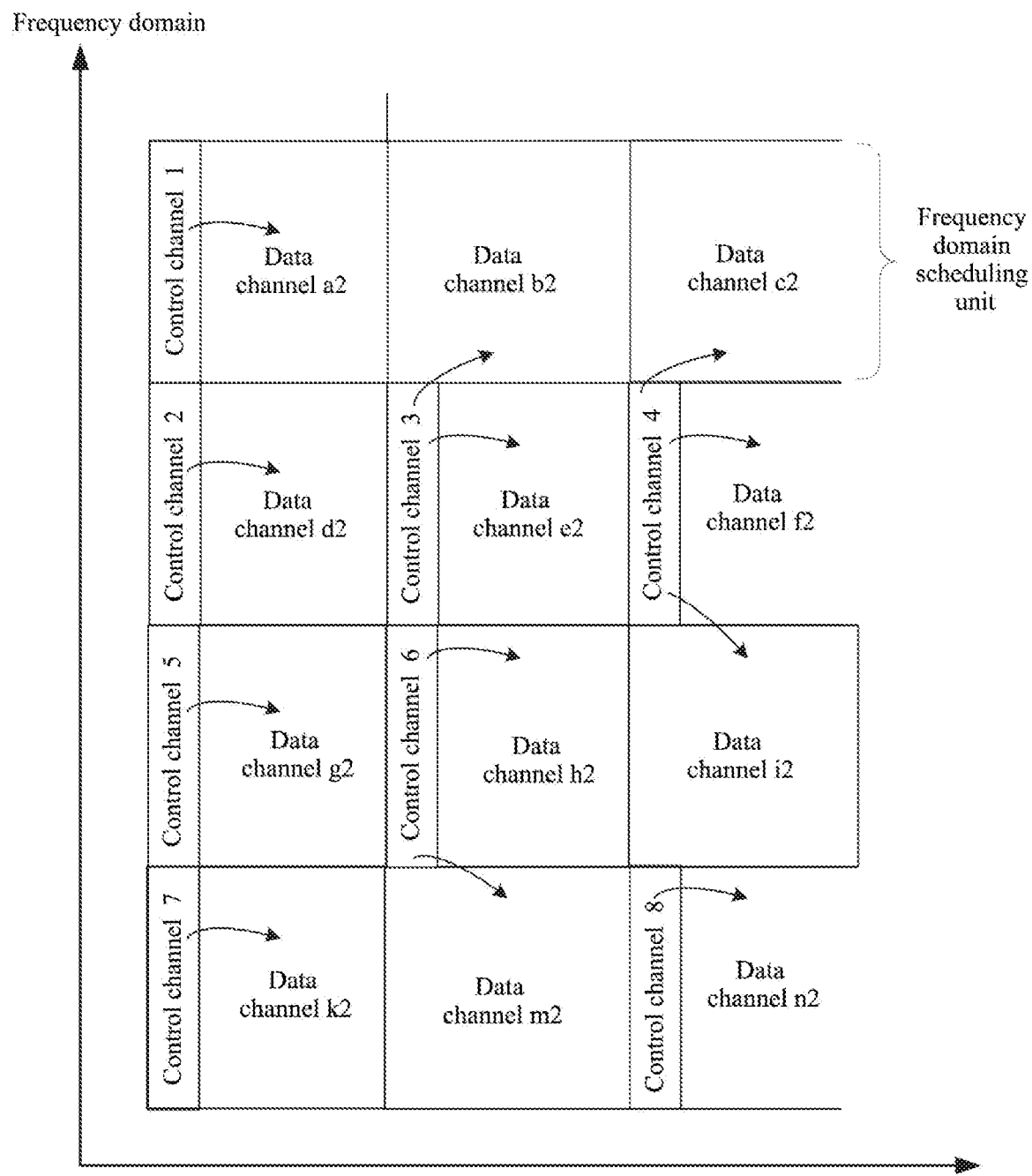
FIG. 5C is a schematic diagram according to a typical scheduling manner of a control channel to a data channel.

FIG. 5C shows a conventional scheduling method.

As shown in FIG. 5C, control channel 1 may schedule data channel a2, control channel 2 may schedule data channel d2, control channel 3 may schedule data channel b2 and data channel e2, control channel 4 may schedule data channel c2, data channel f, and data channel i2, control channel 5 may schedule data channel g2, control channel 6 may schedule data channel h2 and data channel m2, control channel 7 may schedule data channel k2, and control channel 8 may schedule data channel n2.

Figure 5D:
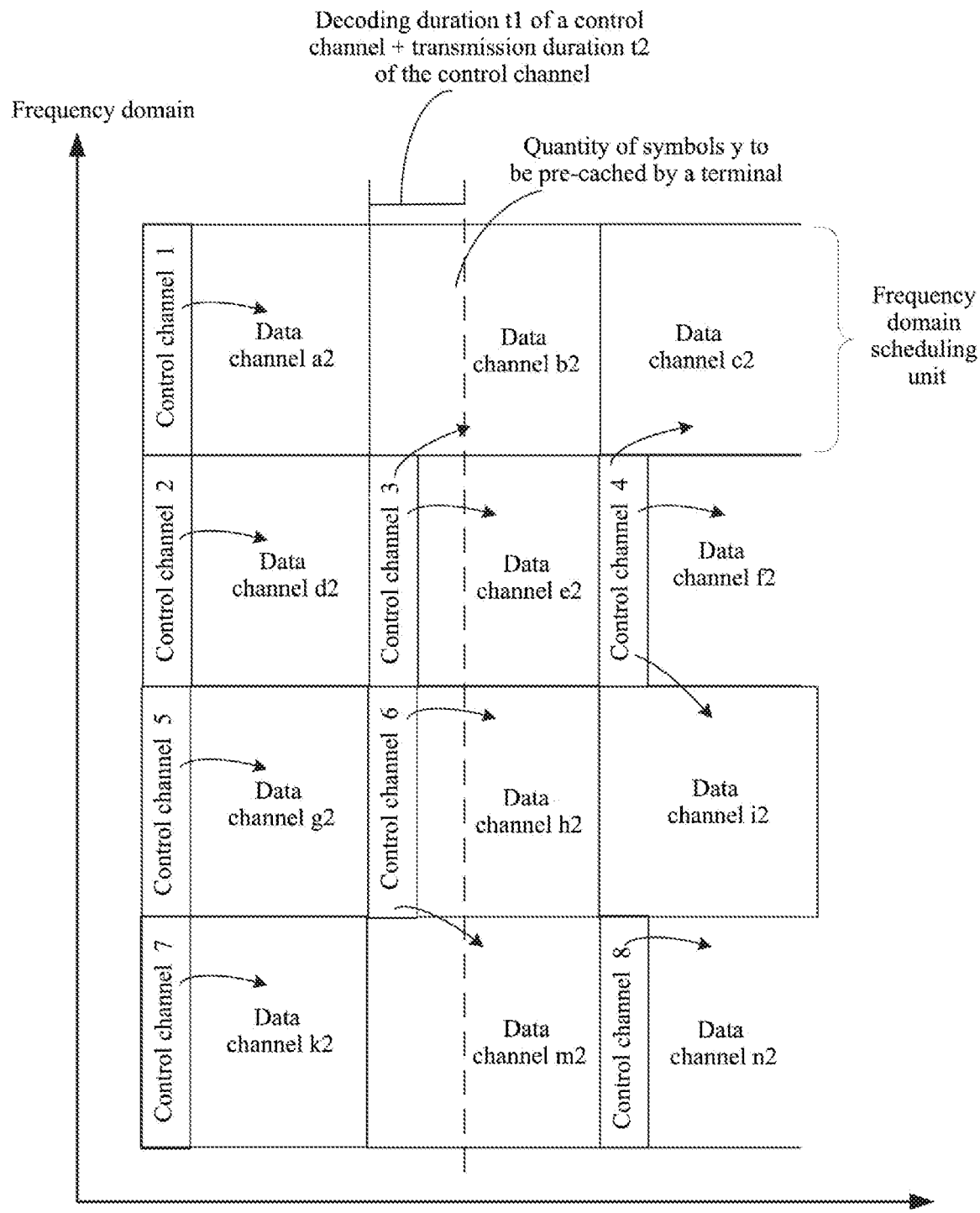
FIG. 5D is a schematic diagram of symbols required to be pre-stored by a terminal device using the scheduling manner shown in FIG. 5C.

FIG. 5D shows, using the scheduling method shown in FIG. 5C, the quantity of symbols that a terminal needs to pre-cache when the terminal device decodes the control channels 3 and 6. As shown in FIG. 5D, a duration required for caching a data channel is a sum of a decoding duration t1 of a control channel and a transmission duration t2 of the control channel, the quantity of symbols to be pre-cached by the terminal is y, wherein the quantity of symbols y is significantly greater than the quantity of symbols x.

As may be seen from FIGS. 5B and 5D, by adopting the scheduling method of the present disclosure, the quantity of symbols that a terminal device needs to cache may be reduced.

Figure 6:
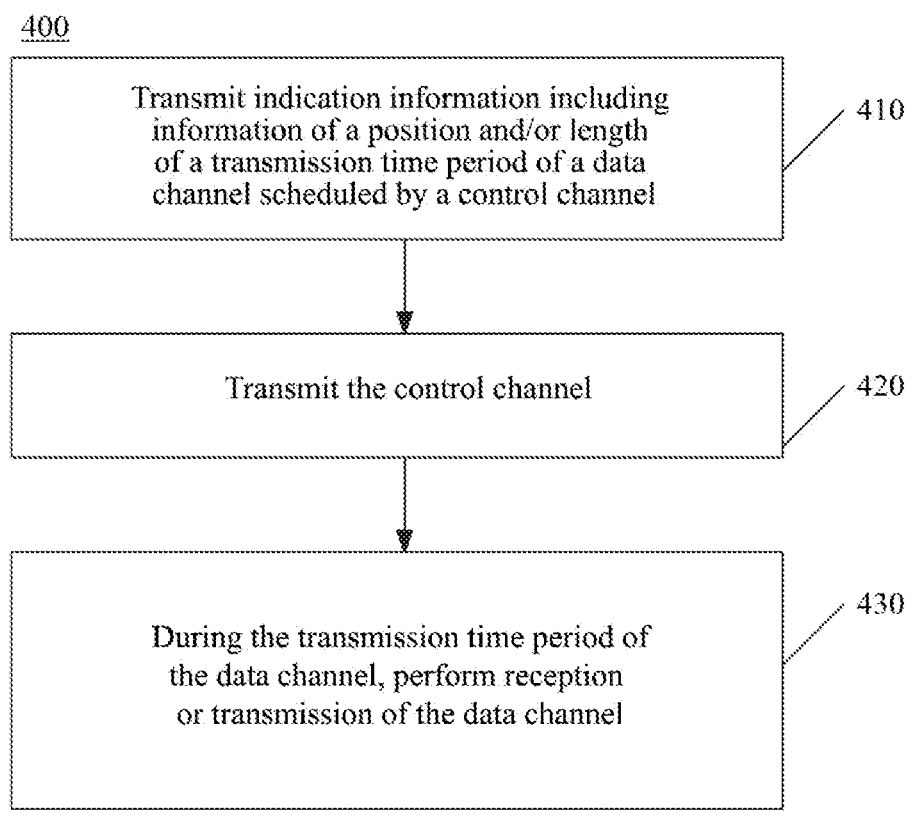
FIG. 6 is a schematic flowchart of a wireless communication method according to an implementation of the present disclosure.

FIG. 6 is a schematic flowchart of a communication method 400 according to an implementation of the present disclosure. As shown in FIG. 6, the method 400 includes acts 410-430. The method is optionally performed by a network device.

In 410, indication information including information of a position and/or length of a transmission time period of a data channel scheduled by a control channel is transmitted.

Optionally, the indication information is transmitted to a terminal device.

In 420, the control channel is transmitted.

Optionally, the control channel is transmitted to the terminal device.

In 430, during the transmission time period of the data channel, reception or transmission of the data channel is performed.

Optionally, during the transmission time period of the data channel, reception and transmission of the data channel is performed with the terminal device.

Figure 7:
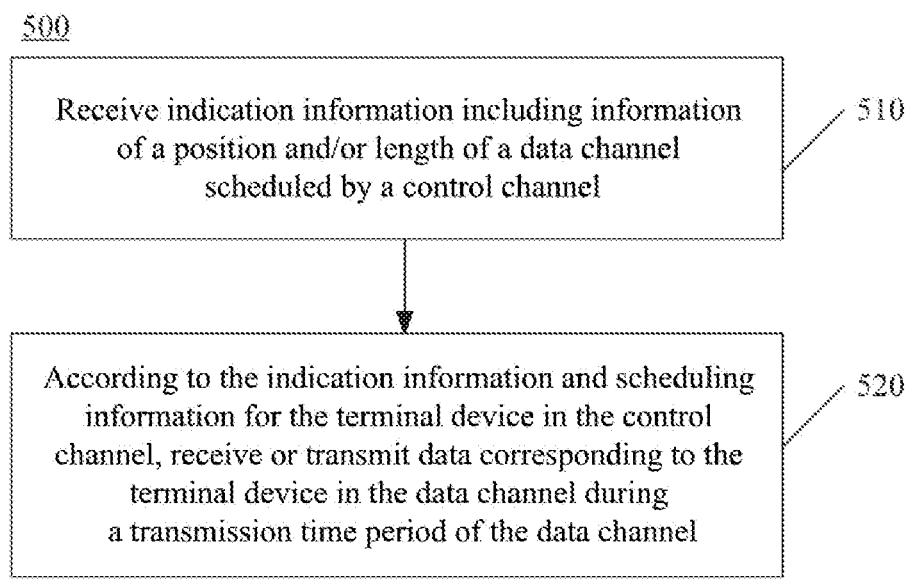
FIG. 7 is a schematic flowchart of a wireless communication method according to an implementation of the present disclosure.

FIG. 7 is a schematic flowchart of a communication method 500 according to an implementation of the present disclosure. As shown in FIG. 7, the method 500 includes acts 510-520. The method is optionally performed by a terminal device.

In 510, indication information including information of a position and/or length of a data channel scheduled by a control channel is received.

Optionally, indication information transmitted by a network device is received.

In 520, according to the indication information and scheduling information for the terminal device in the control channel, data corresponding to the terminal device in the data channel is received or transmitted during a transmission time period of the data channel.

Optionally, the indication information is used for indicating a relative position of a starting position of the transmission time period of the data channel relative to a starting position of a transmission time period of the control channel; or, a relative position of a starting position of the transmission time period of the data channel relative to an ending position of the transmission time period of the control channel.

Optionally, the indication information is transmitted through a high-layer signaling or physical-layer control signaling.

Optionally, in the implementation of the present disclosure, a network device may transmit the indication information in a dynamic or semi-static manner, wherein the dynamic manner is that the indication information each time only carries information of a position and/or a length of transmission time of a data channel corresponding to one control channel; and the semi-static manner is that the indication information each time may carry information of positions and/or lengths of data channels respectively corresponding to multiple control channels, wherein the indication information may be transmitted semi-statically through a high-layer signaling, or the indication information may be transmitted dynamically through a physical-layer control signaling.

Optionally, the high-layer signaling may be a Radio Resource Control (RRC) message, or System Information (SI).

Optionally, the physical-layer control signaling may be Downlink control information (DCI).

Therefore, in the implementation of the present disclosure, a network device transmits indication information to a terminal device, and the indication information includes information of a position and/or a length of a transmission time period of a data channel scheduled by a control channel, and the network device may schedule the data channel according to the indication information, thereby realizing flexible scheduling of the data channel.

Figure 8:
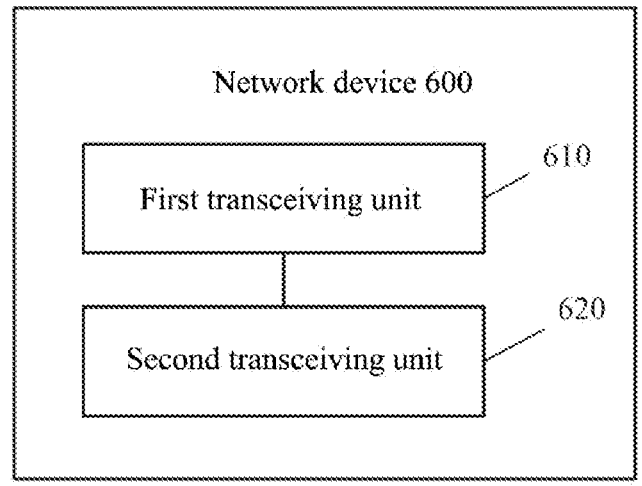
FIG. 8 is a schematic block diagram of a network device according to an implementation of the present disclosure.

FIG. 8 is a schematic block diagram of a network device 600 according to an implementation of the present disclosure. As shown in FIG. 8, the network device 600 includes a first transceiving unit 610 and a second transceiving unit 620. The first transceiving unit 610 is used for transmitting a first control channel in a first period of time, wherein the first control channel carries scheduling information of a first data channel; the second transceiving unit 620 is used for receiving or transmitting the first data channel in a second period of time according to the scheduling information of the first data channel; the first transceiving unit 610 is further used for transmitting a second control channel in a frequency division multiplexing manner with the first data channel in part time of the second period of time; a data channel scheduled by the second control channel does not include the first data channel, wherein a starting position of the part time is not earlier than an ending position of the first period of time.

Optionally, a starting position of the first period of time is earlier than a starting position of the second period of time, the first control channel between the starting position of the first period of time and the starting position of the second period of time, and a second data channel are frequency division multiplexed, and the second data channel is scheduled by a control channel before the first control channel.

Optionally, an ending position of the first period of time is earlier than or equal to a starting position of the second period of time.

Optionally, a starting position of the second control channel in the second period of time is later than the starting position of the second period of time, and/or, an ending position of the second control channel in the second period of time is earlier than an ending position of the second period of time.

Optionally, the second control channel is only transmitted in part time of the second period of time.

Optionally, a time difference between a starting position of the first period of time and a starting position of the second period of time is greater than or equal to the maximum value of multiple time differences, which may exist in a wireless communication process, between multiple control channels and their scheduled data channels.

Optionally, the first transceiving unit 610 is further used for transmitting indication information including information of a position of the second period of time relative to the first period of time and/or information of a length of the second period of time.

Optionally, the indication information is used for indicating a relative position of a starting position of the second period of time relative to a starting position of the first period of time, or for indicating a relative position of the starting position of the second period of time relative to the ending position of the first period of time.

Optionally, the first transceiving unit 610 is further used for transmitting the indication information, wherein the indication information includes information of positions and/or lengths of transmission time corresponding to multiple data channels scheduled by multiple control channels, and the multiple control channels include the first control channel.

Optionally, the first transceiving unit 610 is further used for transmitting the indication information through a high-layer signaling or physical-layer control signaling.

It should be understood that the network device may correspond to the network device in the method 200, and may realize corresponding operations of the network device in the method 200. For the sake of brevity, it will not be repeated here.

Figure 9:
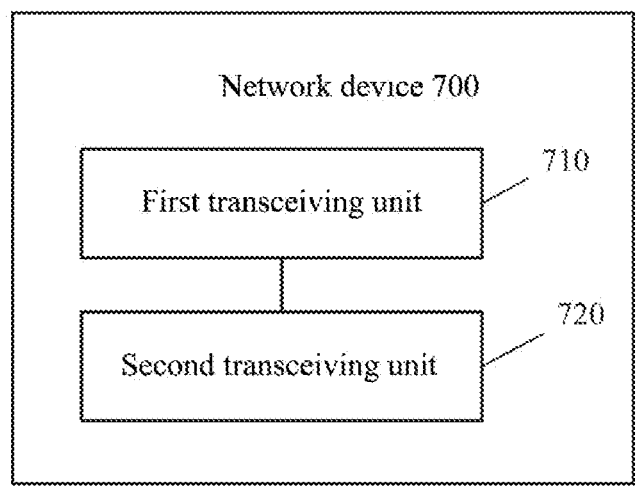
FIG. 9 is a schematic block diagram of a network device according to an implementation of the present disclosure.

FIG. 9 is a schematic block diagram of a network device 700 according to an implementation of the present disclosure. As shown in FIG. 9, the network device 700 includes a first transceiving unit 710 and a second transceiving unit 720. The first transceiving unit 710 is used for transmitting indication information including information of a position and/or length of a transmission time period of a data channel scheduled by a control channel; transmitting the control channel; the second transceiving unit 720 is used for receiving or transmitting the data channel during the transmission time period of the data channel.

Optionally, the indication information is used for indicating a relative position of a starting position of the transmission time period of the data channel relative to a starting position of a transmission time period of the control channel; or, a relative position of a starting position of the transmission time period of the data channel relative to an ending position of a transmission time period of the control channel.

Optionally, the first transceiving unit 710 is further used for transmitting the indication information, wherein the indication information includes information of positions and/or lengths of transmission time corresponding to multiple data channels scheduled by multiple control channels, and the multiple control channels include the control channel.

Optionally, the first transceiving unit 710 is further used for transmitting the indication information through a high-layer signaling or physical-layer signaling.

It should be understood that the network device may correspond to the network device in the method 400, and may realize corresponding operations of the network device in the method 400. For the sake of brevity, the description thereof will not be repeated here.

Figure 10:
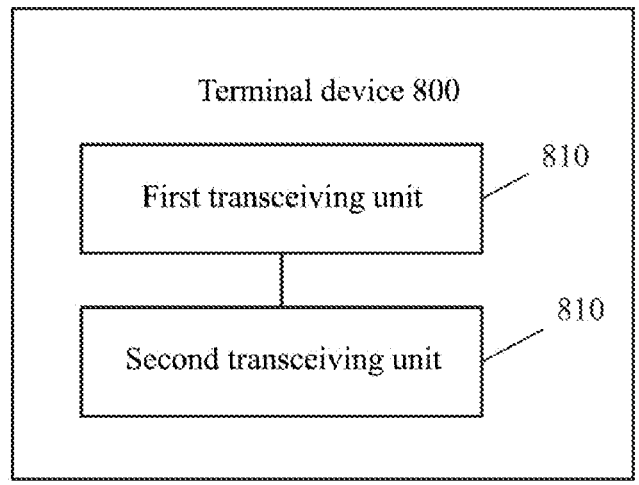
FIG. 10 is a schematic block diagram of a terminal device according to an implementation of the present disclosure.

FIG. 10 is a schematic block diagram of a terminal device 800 according to an implementation of the present disclosure. As shown in FIG. 10, the terminal device 800 includes a first transceiving unit 810 and a second transceiving unit 820; the first transceiving unit 810 is used for receiving scheduling information corresponding to the terminal device in scheduling information of a first data channel on a first control channel transmitted in a first period of time, wherein the first control channel is used for scheduling the first data channel, and the first data channel is transmitted in a second period of time; the second transceiving unit 820 is used for receiving or transmitting data corresponding to the terminal device in the first data channel according to the scheduling information for the terminal device; wherein the first data channel and a second control channel are frequency division multiplexed in part time of the second period of time, and a data channel scheduled by the second control channel does not include the first data channel, wherein a starting position of the part time is not earlier than an ending position of the first period of time.

Optionally, a starting position of the first period of time is earlier than a starting position of the second period of time, the first control channel between the starting position of the first period of time and the starting position of the second period of time, and a second data channel are frequency division multiplexed, and the second data channel is scheduled by a control channel before the first control channel.

Optionally, an ending position of the first period of time is earlier than or equal to the starting position of the second period of time.

Optionally, a starting position of the second control channel in the second period of time is later than the starting position of the second period of time, and/or, an ending position of the second control channel in the second period of time is earlier than an ending position of the second period of time.

Optionally, the second control channel is only transmitted in part time of the second period of time.

Optionally, a time difference between the starting position of the first period of time and the starting position of the second period of time is greater than or equal to the maximum value of multiple time differences, which may exist in a wireless communication process, between multiple control channels and their scheduled data channels.

Optionally, the first transceiving unit 810 is further used for receiving indication information including information of a position of the second period of time relative to the first period of time and/or information of a length of the second period of time; the second transceiving unit 820 is further used for receiving or transmitting data corresponding to the terminal device in the first data channel according to the indication information and the scheduling information.

Optionally, the indication information is used for indicating a relative position of a starting position of the second period of time relative to a starting position of the first period of time, or for indicating a relative position of the starting position of the second period of time relative to the ending position of the first period of time.

Optionally, the first transceiving unit 810 is further used for receiving the indication information, wherein the indication information includes information of positions and/or lengths of transmission time corresponding to multiple data channels scheduled by multiple control channels, and the multiple control channels include the first control channel.

Optionally, the first transceiving unit 810 is further used for receiving the indication information transmitted through a high-layer signaling or physical-layer control signaling.

It should be understood that the terminal device may correspond to the terminal device in the method 300, and may implement corresponding operations of the terminal device in the method 300. For the sake of brevity, it will not be repeated here.

Figure 11:
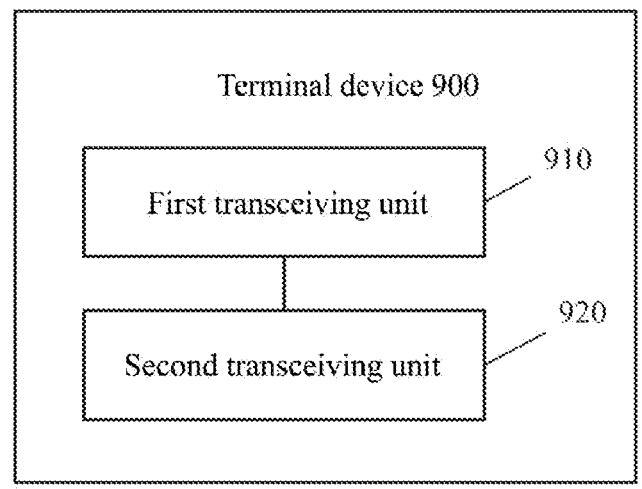
FIG. 11 is a schematic block diagram of a terminal device according to an implementation of the present disclosure.

FIG. 11 is a schematic block diagram of a terminal device 900 according to an implementation of the present disclosure. As shown in FIG. 11, the terminal device 900 includes a first transceiving unit 910 and a second transceiving unit 920; wherein, optionally the first transceiving unit 910 is used for receiving indication information including information of a position and/or a length of a data channel scheduled by a control channel; the second transceiving unit 920 is used for receiving or transmitting data corresponding to the terminal device in the data channel in a transmission time period of the data channel according to the indication information and scheduling information for the terminal device in the control channel.

Optionally, the indication information is used for indicating a relative position of a starting position of a transmission time period of the data channel relative to a starting position of a transmission time period of the control channel; or, a relative position of a starting position of a transmission time period of the data channel relative to an ending position of a transmission time period of the control channel.

Optionally, the first transceiving unit 910 is further used for receiving the indication information, wherein the indication information includes information of positions and/or lengths of transmission time corresponding to multiple data channels scheduled by multiple control channels, and the multiple control channels include the control channel.

Optionally, the first transceiving unit 910 is further used for receiving the indication information transmitted through a high-layer signaling or physical-layer signaling.

It should be understood that the terminal device may correspond to the terminal device in the method 500, and may implement corresponding operations of the terminal device in the method 500. For the sake of brevity, the description thereof will not be repeated here.

Figure 12:
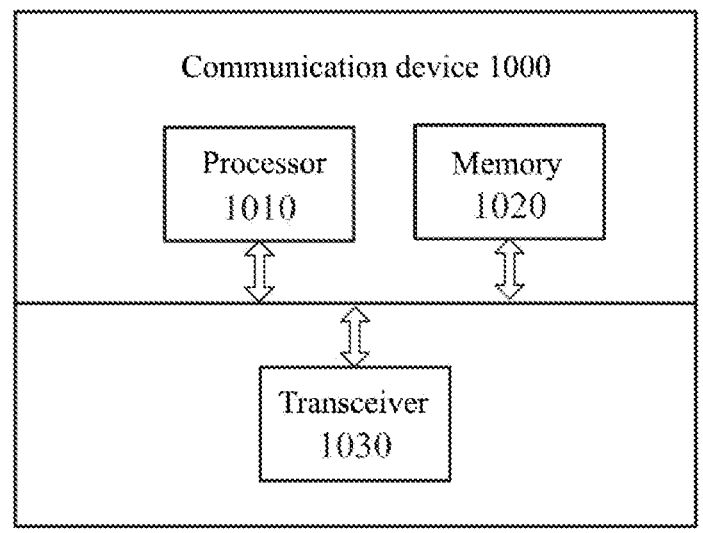
FIG. 12 is a schematic block diagram of a communication device according to an implementation of the present disclosure.

FIG. 12 is a schematic block diagram of a communication device 1000 according to an implementation of the present disclosure. As shown in FIG. 12, the device 1000 may include a processor 1010 and a memory 1020. The memory 1020 may store program codes, and the processor 1010 may execute the program codes stored in the memory 1020.

Optionally, as shown in FIG. 12, the device 1000 may include a transceiver 1030, and the processor 1010 may control the transceiver 1030 to communicate externally.

Optionally, the processor 1010 may call the program codes stored in the memory 1020 to perform corresponding operations of the network device in the method 200 shown in FIG. 2, which will not be described here repeatedly for brevity.

Optionally, the processor 1010 may call the program codes stored in the memory 1020 to perform corresponding operations of the terminal device in the method 300 shown in FIG. 3, which will not be described here repeatedly for brevity.

Optionally, the processor 1010 may call the program codes stored in the memory 1020 to perform corresponding operations of the network device in the method 400, which will not be described here repeatedly for brevity.

Optionally, the processor 1010 may call the program codes stored in the memory 1020 to perform corresponding operations of the terminal device in the method 500 shown in FIG. 7, which will not be described here repeatedly for brevity.

Figure 13:
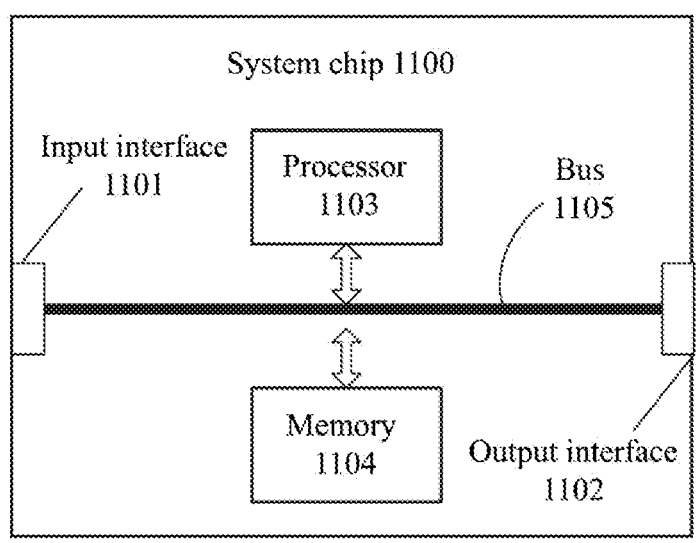
FIG. 13 is a schematic block diagram of a system chip according to an implementation of the present disclosure.

FIG. 13 is a schematic structural diagram of a system chip according to an implementation of the present disclosure. The system chip 1100 of FIG. 13 includes an input interface 1101, an output interface 1102, a processor 1103, and a memory 1104 which are connected by a communication connection, and the processor 1103 is used for executing codes in the memory 1104.

Optionally, when the codes are executed, the processor 1103 implements the method executed by the terminal device in the method implementation. For the sake of brevity, it will not be repeated here.

Optionally, when the codes are executed, the processor 1103 implements the method executed by the network device in the method implementation. For the sake of brevity, it will not be repeated here.

Those of ordinary skill in the art will recognize that various exemplary units and algorithm acts described in the implementations disclosed herein may be realized in electronic hardware, or a combination of computer software and electronic hardware. Whether these functions are performed in hardware or software depends on specific applications and design constraints of the technical solution. Skilled artisans may use different methods to implement the described functions for each particular application, but such implementation should not be considered to be beyond the scope of the present disclosure.

Those skilled in the art may clearly understand that for convenience and conciseness of description, the specific working processes of the system, device and unit described above may refer to the corresponding processes in the aforementioned method implementations and will not be described here.

In several implementations provided by the present disclosure, it should be understood that the disclosed systems, devices and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of solutions of the implementations of the present disclosure.

In addition, various functional units in various implementations of the present disclosure may be integrated in one processing unit, or the various units may be physically present separately, or two or more units may be integrated in one unit.

The functions may be stored in a computer readable memory medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes U disk, mobile hard disk, read-only memory (ROM), random access memory (RAM), magnetic disk or optical disk, and other medium capable of storing program codes.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for wireless communication, comprising:
transmitting a first physical downlink control channel (PDCCH) in a first period of time, wherein the first PDCCH carries scheduling information of a first data channel;
receiving or transmitting the first data channel in the second period of time according to the scheduling information of the first data channel; and
transmitting a second PDCCH in a frequency division multiplexing manner with the first data channel in part time of the second period of time, wherein a data channel scheduled by the second PDCCH does not comprise the first data channel, and a starting position of the part time is not earlier than an ending position of the first period of time;
wherein the first PDCCH, the second PDCCH, the first data channel, and the data channel scheduled by the second PDCCH are located in a plurality of symbols of three adjacent slots.

2. The method according to claim 1, wherein a starting position of the first period of time is earlier than a starting position of the second period of time, the first PDCCH between the starting position of the first period of time and the starting position of the second period of time is frequency division multiplexed with a second data channel, and the second data channel is scheduled by a PDCCH before the first PDCCH.

3. The method according to claim 2, wherein the ending position of the first period of time is earlier than or equal to the starting position of the second period of time.

4. The method according to claim 1, wherein a starting position of the second PDCCH in the second period of time is later than a starting position of the second period of time, or, an ending position of the second PDCCH in the second period of time is earlier than an ending position of the second period of time, or, a starting position of the second PDCCH in the second period of time is later than a starting position of the second period of time and an ending position of the second PDCCH in the second period of time is earlier than an ending position of the second period of time.

5. The method according to claim 1, wherein the second PDCCH is only transmitted in the part time of the second period of time.

6. The method according to claim 1, a time difference between a starting position of the first period of time and a starting position of the second period of time is greater than or equal to a maximum value of multiple time differences, in a wireless communication process, between multiple PDCCHs and data channels scheduled by the multiple PDCCHs.

7. A method for wireless communication, comprising:
receiving, by a terminal device, scheduling information corresponding to the terminal device in scheduling information of a first data channel on a first physical downlink control channel (PDCCH) transmitted in a first period of time, wherein the first PDCCH is used for scheduling the first data channel on the first PDCCH transmitted in the first period of time, and the first data channel is transmitted in a second period of time; and
receiving or transmitting data corresponding to the terminal device in the first data channel according to the scheduling information for the terminal device;
wherein the first data channel and a second PDCCH are frequency division multiplexed in part time of the second period of time, a data channel scheduled by the second PDCCH does not comprise the first data channel, and wherein a starting position of the part time is not earlier than an ending position of the first period of time;
wherein the first PDCCH, the second PDCCH, the first data channel, and the data channel scheduled by the second PDCCH are located in a plurality of symbols of three adjacent slots.

8. The method according to claim 7, wherein a starting position of the first period of time is earlier than a starting position of the second period of time, the first PDCCH between the starting position of the first period of time and the starting position of the second period of time is frequency division multiplexed with a second data channel, and the second data channel is scheduled by a PDCCH before the first PDCCH.

9. The method according to claim 8, wherein the ending position of the first period of time is earlier than or equal to the starting position of the second period of time.

10. The method according to claim 7, wherein a starting position of the second PDCCH in the second period of time is later than a starting position of the second period of time, or, an ending position of the second PDCCH in the second period of time is earlier than an ending position of the second period of time, or, a starting position of the second PDCCH in the second period of time is later than a starting position of the second period of time and an ending position of the second PDCCH in the second period of time is earlier than an ending position of the second period of time.

11. The method according to claim 7, wherein the second PDCCH is only transmitted in the part time of the second period of time.

12. The method according to claim 7, a time difference between a starting position of the first period of time and a starting position of the second period of time is greater than or equal to a maximum value of multiple time differences, in a wireless communication process, between multiple PDCCHs and data channels scheduled by the multiple PDCCHs.

13. An apparatus in a communication device, comprising:
a processor and a memory storing program instructions;
wherein when the program instructions are executed by the processor, the processor is configured to:
output a first physical downlink control channel (PDCCH) in a first period of time, wherein the first PDCCH carries scheduling information of a first data channel, wherein the first PDCCH is used for scheduling the first data channel on the first PDCCH transmitted in the first period of time, and the first data channel is transmitted in a second period of time;
obtain or output the first data channel in the second period of time according to the scheduling information of the first data channel; and
output a second PDCCH in a frequency division multiplexing manner with the first data channel in part time of the second period of time,
wherein a data channel scheduled by the second PDCCH does not comprise the first data channel, and a starting position of the part time is not earlier than an ending position of the first period of time;
wherein the first PDCCH, the second PDCCH, the first data channel, and the data channel scheduled by the second PDCCH are located in a plurality of symbols of three adjacent slots.

14. The apparatus according to claim 13, wherein a starting position of the first period of time is earlier than a starting position of the second period of time, the first PDCCH between the starting position of the first period of time and the starting position of the second period of time is frequency division multiplexed with a second data channel, and the second data channel is scheduled by a PDCCH before the first PDCCH.

15. The apparatus according to claim 14, wherein the ending position of the first period of time is earlier than or equal to the starting position of the second period of time.

16. The apparatus according to claim 13, wherein a starting position of the second PDCCH in the second period of time is later than a starting position of the second period of time, or, an ending position of the second PDCCH in the second period of time is earlier than an ending position of the second period of time, or, a starting position of the second PDCCH in the second period of time is later than a starting position of the second period of time and an ending position of the second PDCCH in the second period of time is earlier than an ending position of the second period of time.

17. The apparatus according to claim 13, wherein the processor is configured to:
   obtain indication information comprising information of a position of the second period of time relative to the first period of time or information of a length of the second period of time; and
   output the indication information, wherein the indication information indicates a relative position of a starting position of the second period of time relative to a starting position of the first period of time, or for indicating a relative position of a starting position of the second period of time relative to the ending position of the first period of time;
or,
wherein the processor is further configured to:
output the indication information, wherein the indication information comprises information of positions or lengths of transmission time corresponding to multiple data channels scheduled by multiple PDCCHs, and the multiple PDCCHs comprise the first PDCCH;
or,
wherein the processor is further configured to:
output the indication information through a high-layer signaling or physical-layer control signaling.

18. An apparatus in a communication device, comprising:
a processor and a memory storing program instructions;
wherein when the program instructions are executed by the processor, the processor is configured to:
obtain scheduling information corresponding to the apparatus in scheduling information of a first data channel on a first physical downlink control channel (PDCCH) transmitted in a first period of time, wherein the first PDCCH is used for scheduling the first data channel, and the first data channel is transmitted in a second period of time; and
obtain or output data corresponding to the apparatus in the first data channel according to the scheduling information for the apparatus,
wherein the first data channel and a second PDCCH are frequency division multiplexed in part time of the second period of time, and a data channel scheduled by the second PDCCH does not comprise the first data channel, wherein a starting position of the part time is not earlier than an ending position of the first period of time;
wherein the first PDCCH, the second PDCCH, the first data channel, and the data channel scheduled by the second PDCCH are located in a plurality of symbols of three adjacent slots.

19. The apparatus according to claim 18, wherein a starting position of the first period of time is earlier than a starting position of the second period of time, the first PDCCH between the starting position of the first period of time and the starting position of the second period of time is frequency division multiplexed with a second data channel, and the second data channel is scheduled by a PDCCH before the first PDCCH.

20. The apparatus according to claim 19, wherein the ending position of the first period of time is earlier than or equal to the starting position of the second period of time.

21. The apparatus according to claim 18, wherein a starting position of the second PDCCH in the second period of time is later than a starting position of the second period of time, or, an ending position of the second PDCCH in the second period of time is earlier than an ending position of the second period of time, or, a starting position of the second PDCCH in the second period of time is later than a starting position of the second period of time and an ending position of the second PDCCH in the second period of time is earlier than an ending position of the second period of time.

22. The apparatus according to claim 18, wherein the processor is further configured to:
   obtain indication information comprising information of a position of the second period of time relative to the first period of time or information of a length of the second period of time; and
   obtain or output the data corresponding to the apparatus in the first data channel according to the indication information and the scheduling information for the apparatus, wherein the indication information is used for indicating a relative position of a starting position of the second period of time relative to a starting position of the first period of time, or for indicating a relative position of a starting position of the second period of time relative to the ending position of the first period of time;
or,
wherein the processor is further configured to:
obtain the indication information, wherein the indication information comprises information of positions or lengths of transmission time corresponding to multiple data channels scheduled by multiple PDCCHs, and the multiple PDCCHs comprise the first PDCCH;
or,
wherein the processor is further configured to:
obtain the indication information transmitted through a high-layer signaling or physical-layer control signaling.

* * * * *